US009485700B2

(12) United States Patent
Xiong et al.

(10) Patent No.: US 9,485,700 B2
(45) Date of Patent: Nov. 1, 2016

(54) DATA OFFLOADING METHOD, USER EQUIPMENT, MACRO BASE STATION, AND SMALL NODE

(71) Applicant: HUAWEI TECHNOLOGIES CO., LTD., Shenzhen, Guangdong (CN)

(72) Inventors: Xin Xiong, Beijing (CN); Weiwei Song, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/603,745

(22) Filed: Jan. 23, 2015

(65) Prior Publication Data
US 2015/0133128 A1 May 14, 2015

Related U.S. Application Data

(63) Continuation of application No. PCT/CN2012/079069, filed on Jul. 23, 2012.

(51) Int. Cl.
*H04W 36/22* (2009.01)
*H04W 76/04* (2009.01)
(Continued)

(52) U.S. Cl.
CPC ............ *H04W 36/22* (2013.01); *H04W 76/02* (2013.01); *H04W 76/04* (2013.01); *H04W 24/10* (2013.01); *H04W 84/045* (2013.01); *Y02B 60/50* (2013.01)

(58) Field of Classification Search
CPC .......... H04W 36/04; H04W 36/0072; H04W 36/20; H04W 36/22; H04W 36/0027; H04W 88/08; H04W 56/001; H04W 74/004; H04W 74/0833; H04W 72/0406; H04L 5/0048
USPC ........ 455/438, 444, 522, 436; 370/328, 331, 370/337
See application file for complete search history.

(56) References Cited

U.S. PATENT DOCUMENTS

2010/0034163 A1  2/2010  Damnjanovic et al.
2012/0113844 A1  5/2012  Krishnamurthy
(Continued)

FOREIGN PATENT DOCUMENTS

CN  101674664  3/2010
CN  101772093  7/2010
(Continued)

OTHER PUBLICATIONS

International Search Report mailed May 2, 2013, in corresponding International Patent Application No. PCT/CN2012/079069.
PCT International Search Report dated May 2, 2013 in corresponding International Patent Application No. PCT/CN2012/079069.
(Continued)

*Primary Examiner* — Phuoc H Doan
(74) *Attorney, Agent, or Firm* — Staas & Halsey LLP

(57) ABSTRACT

A data offloading method includes: receiving, by a macro base station, a measurement report sent by a user equipment; sending, by the macro base station according to the measurement report, an RRC connection reconfiguration message and an offloading configuration message to the user equipment and a small node respectively, so as to configure a user plane data transmission link between the macro base station and the user equipment, where the RRC connection reconfiguration message includes indication information that indicates that one direction of a duplex direction of a current transmission link is kept, and resource configuration information in the other direction; and performing, by the macro base station, user plane data transmission with the user equipment over the configured transmission link. The embodiments of the present invention are applicable to the field of communications technologies.

20 Claims, 6 Drawing Sheets

(51) Int. Cl.
*H04W 76/02* (2009.01)
*H04W 24/10* (2009.01)
*H04W 84/04* (2009.01)

(56) References Cited

U.S. PATENT DOCUMENTS

2013/0107798 A1* 5/2013 Gao .................. H04W 72/1226
370/328
2015/0031369 A1* 1/2015 Gunnarsson .......... H04W 36/04
455/438

FOREIGN PATENT DOCUMENTS

| | | |
|---|---|---|
| CN | 102421146 | 4/2012 |
| EP | 2375809 A1 | 10/2011 |
| GB | 2486926 | 7/2012 |
| WO | 2011/100492 A1 | 8/2011 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.2.0, Jun. 2012, pp. 1-201.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.0.0, Jun. 2012, pp. 1-302.
"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.0.0, Jun. 2012, pp. 1-258.
"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.1.0, Jun. 2012, pp. 1-134.
Extended European Search Report dated Oct. 13, 2015 in corresponding European Patent Application No. 12881568.5.

\* cited by examiner

DATA OFFLOADING METHOD, USER EQUIPMENT, MACRO BASE STATION, AND SMALL NODE

CROSS-REFERENCE TO RELATED APPLICATIONS

This application is a continuation of International Application No. PCT/CN2012/079069, filed on Jul. 23, 2012, which is hereby incorporated by reference in its entirety.

TECHNICAL FIELD

The present invention relates to the field of communications technologies, and in particular, to a data offloading method, a user equipment, a macro base station, and a small node.

BACKGROUND

With rapid development of the third generation mobile communications technology and a massive increase in smartphone users, mobile data service traffic is also sharply increasing. To relieve pressure of the mobile data service traffic, an operator deploys a large number of small nodes on a third generation mobile communications network, where the small nodes can effectively enhance a capacity of the whole mobile communications network.

However, on a heterogeneous network where a macro base station and a small node are deployed, in a scenario in which coverage of a small node is overlaid with coverage of a macro base station, when a user equipment moves to an edge of a coverage area of a small node which is in a coverage area of the macro base station, the user equipment does not enter the coverage area of the small node; therefore, the user equipment still sends a signal to the macro base station over a direct path between the user equipment and the macro base station. When the user equipment is at the edge of the coverage area of the small node, the user equipment is relatively far from the macro base station; therefore, relatively high transmit power is needed to send the signal to the macro base station, and in this case, power consumption of the user equipment is relatively high in an edge area of the small node. In addition, an uplink working frequency of the user equipment may be the same as that of the small node; and in the edge area of the small node, when the user equipment transmits a high-power signal to the macro base station, co-channel interference is caused on uplink receiving of the small node.

SUMMARY

Embodiments of the present invention provide a data offloading method, a user equipment, a macro base station, and a small node, which can effectively reduce power consumption of the user equipment, and further avoid co-channel interference caused by the user equipment on uplink receiving of the small node.

To achieve the foregoing objective, the following technical solutions are used in the embodiments of the present invention:

According to a first aspect, a data offloading method in a scenario in which coverage of small node is overlaid with coverage of a a macro base station is provided, and the method includes:

receiving, by the macro base station, a measurement report sent by a user equipment;

sending, by the macro base station according to the measurement report, an RRC connection reconfiguration message and an offloading configuration message to the user equipment and the small node respectively, so as to configure a user plane data transmission link between the macro base station and the user equipment, where the RRC connection reconfiguration message includes indication information that indicates that one direction of a duplex direction of a current transmission link is kept, and resource configuration information in the other direction; and performing, by the macro base station, user plane data transmission with the user equipment over the configured transmission link.

According to a second aspect, a data offloading method in a scenario in which coverage of a small node is overlaid with coverage of a macro base station is further provided, and the method includes:

sending, by a user equipment, a measurement report to the macro base station;

receiving, by the user equipment, an RRC connection reconfiguration message that is sent according to the measurement report, which is sent by the user equipment, by the macro base station, and configuring a user plane data transmission link between the user equipment and the macro base station according to the RRC connection reconfiguration message, where the RRC connection reconfiguration message includes indication information that indicates that one direction of a duplex direction of a current transmission link is kept, and resource configuration information in the other direction; and performing, by the user equipment, user plane data transmission with the macro base station over the configured transmission link.

According to a third aspect, a data offloading method in a scenario in which coverage of a small node is overlaid with coverage of a macro base station is further provided, and the method includes:

receiving, by the small node, an offloading configuration message that is sent according to a measurement report, which is sent by a user equipment, by the macro base station, where the offloading configuration message carries an uplink or downlink radio resource that is used by the small node and the user equipment to establish a user plane connection;

configuring, by the small node, an uplink or downlink user plane data transmission link between the small node and the user equipment according to the offloading configuration message; and forwarding, by the small node, user plane data according to the configured transmission link, where the user plane data is transmitted between the user equipment and the macro base station.

According to a fourth aspect, a macro base station is further provided, and the macro base station includes a transceiver and a processor, where:

the transceiver is configured to receive a measurement report sent by a user equipment, and send the measurement report to the processor;

the processor is configured to receive the measurement report sent by the transceiver, configure a user plane data transmission link between the macro base station and the user equipment according to the measurement report, determine an RRC connection reconfiguration message and an offloading configuration message that are sent to the user equipment and a small node respectively, and send the RRC connection reconfiguration message and the offloading configuration message to the transceiver, where the RRC connection reconfiguration message includes indication information that indicates that one direction of a duplex direction of a current transmission link is kept, and resource configuration information in the other direction;

the transceiver is further configured to receive the RRC connection reconfiguration message and the offloading configuration message that are sent by the processor, and send the RRC connection reconfiguration message and the offloading configuration message to the user equipment and the small node respectively; and the transceiver is further configured to perform user plane data transmission with the user equipment over the configured transmission link.

According to a fifth aspect, a user equipment is provided, and the user equipment includes a transceiver and a processor, where:

the transceiver is configured to send a measurement report to a macro base station, so that the macro base station respectively sends an RRC connection reconfiguration message and an offloading configuration message to the user equipment and a small node according to the measurement report, so as to configure a user plane data transmission link between the macro base station and the user equipment;

the transceiver is further configured to receive the RRC connection reconfiguration message that is sent according to the measurement report, which is sent by the user equipment, by the macro base station, and send the RRC connection reconfiguration message to the processor, where the RRC connection reconfiguration message includes indication information that indicates that one direction of a duplex direction of a current transmission link is kept, and resource configuration information in the other direction;

the processor is configured to receive the RRC connection reconfiguration message sent by the transceiver, and configure the user plane data transmission link between the user equipment and the macro base station according to the RRC connection reconfiguration message; and the transceiver is further configured to perform user plane data transmission with the macro base station over the transmission link that is configured by the processor.

According to a sixth aspect, a small node is further provided, and the small node includes a transceiver and a processor, where the transceiver is configured to receive an offloading configuration message that is sent according to a measurement report, which is sent by a user equipment, by a macro base station, and send the offloading configuration message to the processor, where the offloading configuration message carries an uplink or downlink radio resource that is used by the small node and the user equipment to establish a user plane connection;

the processor is configured to receive the offloading configuration message sent by the transceiver, and configure an uplink or downlink user plane data transmission link between the small node and the user equipment according to the offloading configuration message; and the transceiver is further configured to forward, according to the transmission link configured by the processor, user plane data that is transmitted between the user equipment and the macro base station.

Embodiments of the present invention provide the data offloading method, the macro base station, the user equipment, and the small node. The macro base station determines an area range of the user equipment by using a measurement report sent by the user equipment. A user plane data transmission link may be configured between the macro base station and the user equipment according to the area range of the user equipment, and based on a principle of reducing power consumption of the user equipment and avoiding co-channel interference generated by the user equipment on uplink receiving of the small node, thereby reducing power consumed by the user equipment for sending an uplink signal, and avoiding co-channel interference generated by the user equipment on uplink receiving of the small node.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
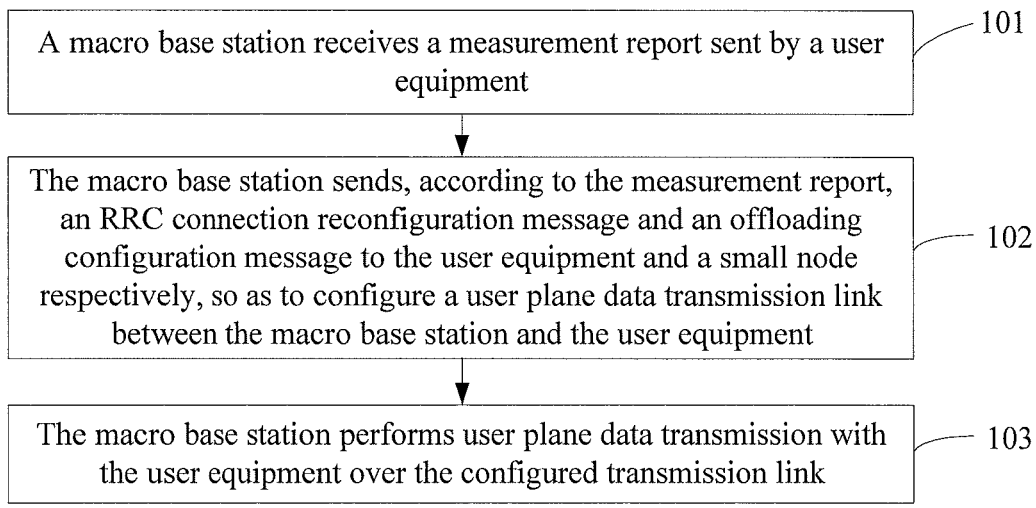
FIG. 1 is a schematic flowchart of a data offloading method according to an embodiment of the present invention.

As shown in FIG. 1, an embodiment of the present invention provides a data offloading method, where the data offloading method is applied to a scenario in which coverage of a small node is overlaid with coverage of a macro base station; the method is executed by the macro base station; and the method includes:

101. A macro base station receives a measurement report sent by a user equipment.

The user equipment performs measurement according to a measurement configuration parameter configured by the macro base station; the user equipment may measure a path loss from the user equipment to the macro base station, or measure signal strength RSRP and signal quality RSRQ of a signal transmitted from the user equipment to the macro base station. The user equipment may periodically report the measurement report to the macro base station or report, according to measurement reporting request message that is sent by the macro base station, the measurement report to the macro base station.

102. The macro base station sends, according to the measurement report, an RRC connection reconfiguration message and an offloading configuration message to the user equipment and a small node respectively, so as to configure a user plane data transmission link between the macro base station and the user equipment.

The RRC connection reconfiguration message includes indication information that indicates that one direction of a duplex direction of a current transmission link is kept, and resource configuration information in the other direction.

When the user equipment performs handover between the macro base station and the small node, the macro base station determines an area range of the user equipment according to the measurement report sent by the user equipment, so as to configure a different user plane data transmission link between the user equipment and the macro base station according to a different area range in which the user equipment is located.

Specifically, to reduce power consumption of the user equipment in an edge area of the small node and avoid co-channel interference generated on uplink receiving of the small node, when the user equipment enters the edge area of the small node from an coverage area of the macro base station, the macro base station first offloads uplink data of the user equipment to the small node; and then, when the user equipment moves from the edge area of the small node to a coverage area of the small node, the macro base station then offloads downlink data of the user equipment to the small node. In this way, the macro base station offloads data to the small node according to an uplink or downlink requirement of the user equipment, and may send the RRC connection reconfiguration message and the offloading configuration message to the user equipment and the small node, so as to configure a different user plane data transmission link between the macro base station and the user equipment.

103. The macro base station performs user plane data transmission with the user equipment over the configured transmission link.

Figure 2:
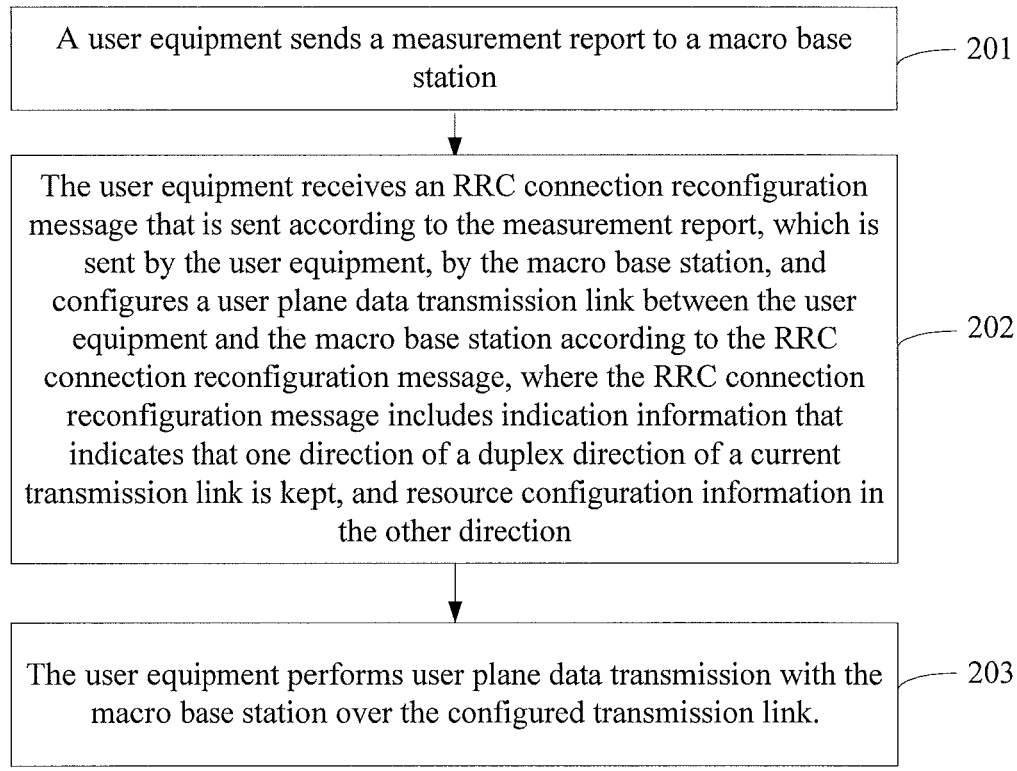
FIG. 2 is a schematic flowchart of another data offloading method according to an embodiment of the present invention.

As shown in FIG. 2, this embodiment of the present invention further provides a data offloading method, where the data offloading method is applied to a scenario in which coverage of a small node is overlaid with coverage of a macro base station; the method is executed by a user equipment; and the method includes:

201. A user equipment sends a measurement report to a macro base station.

The user equipment performs measurement according to a measurement configuration parameter configured by the macro base station; the user equipment may measure a path loss from the user equipment to the macro base station, or measure signal strength RSRP and signal quality RSRQ of a signal transmitted from the user equipment to the macro base station. The user equipment may periodically report the measurement report to the macro base station or report, according to measurement reporting request message that is sent by the macro base station, the measurement report to the macro base station.

The macro base station may determine an area range of the user equipment according to the measurement report, where the measurement report is based on the path loss, or the signal quality and the signal strength and is reported by the user equipment.

202. The user equipment receives an RRC connection reconfiguration message that is sent according to the measurement report, which is sent by the user equipment, by the macro base station, and configures a user plane data transmission link between the user equipment and the macro base station according to the RRC connection reconfiguration message, where the RRC connection reconfiguration message includes indication information that indicates that one direction of a duplex direction of a current transmission link is kept, and resource configuration information in the other direction.

When the user equipment performs handover between the macro base station and a small node, the macro base station determines an area range of the user equipment according to the measurement report sent by the user equipment, so as to configure a different user plane data transmission link between the user equipment and the macro base station according to a different area range in which the user equipment is located.

Specifically, to reduce power consumption of the user equipment in an edge area of the small node and avoid co-channel interference generated on uplink receiving of the small node, when the user equipment enters the edge area of the small node from an coverage area of the macro base station, the macro base station first offloads uplink data of the user equipment to the small node; and then, when the user equipment moves from the edge area of the small node to a coverage area of the small node, the macro base station then offloads downlink data of the user equipment to the small node. In this way, the macro base station offloads data to the small node according to an uplink or downlink requirement of the user equipment, and may send the RRC connection reconfiguration message and an offloading configuration message to the user equipment and the small node, so as to configure a different user plane data transmission link between the macro base station and the user equipment.

203. The user equipment performs user plane data transmission with the macro base station over the configured transmission link.

Figure 3:
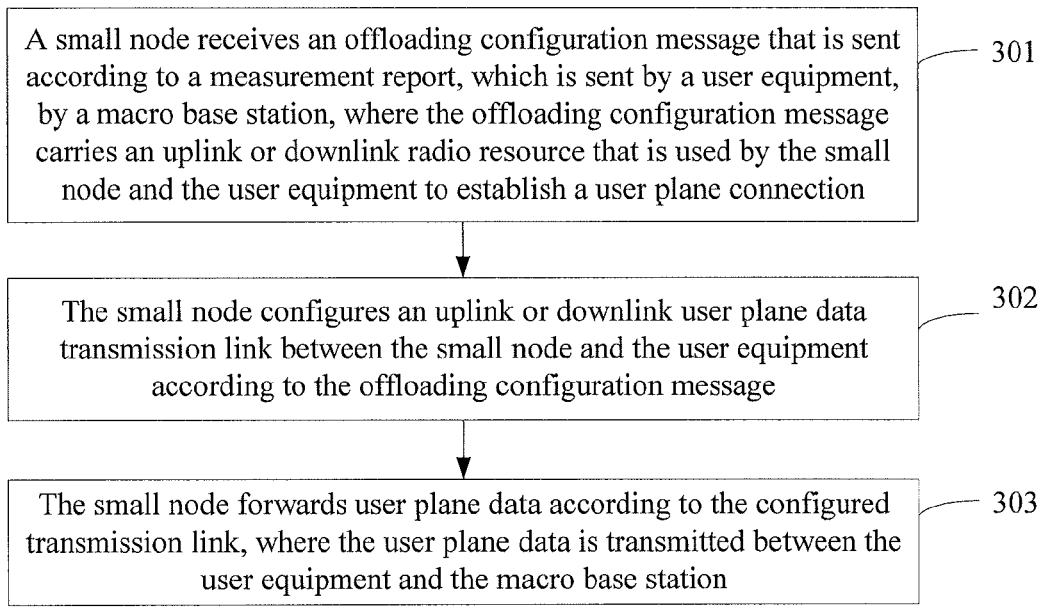
FIG. 3 is a schematic flowchart of another data offloading method according to an embodiment of the present invention.

As shown in FIG. 3, this embodiment of the present invention further provides a data offloading method, where the data offloading method is applied to a scenario in which coverage of a small node is overlaid with coverage of a macro base station; the method is executed by the small node; and the method includes:

301. A small node receives an offloading configuration message that is sent according to a measurement report, which is sent by a user equipment, by a macro base station, where the offloading configuration message carries an uplink or downlink radio resource that is used by the small node and the user equipment to establish a user plane connection.

When the user equipment performs handover between the macro base station and the small node, the macro base station determines an area range of the user equipment according to the measurement report sent by the user equipment, so as to configure a different user plane data transmission link between the user equipment and the macro base station according to a different area range in which the user equipment is located.

Specifically, to reduce power consumption of the user equipment in an edge area of the small node and avoid co-channel interference generated on uplink receiving of the small node, when the user equipment enters the edge area of the small node from an coverage area of the macro base station, the macro base station first offloads uplink data of the user equipment to the small node; and then, when the user equipment moves from the edge area of the small node to a coverage area of the small node, the macro base station then offloads downlink data of the user equipment to the small node. In this way, the macro base station offloads data to the small node according to an uplink or downlink requirement of the user equipment, and may send an RRC connection reconfiguration message and the offloading configuration message to the user equipment and the small node, so as to configure a different user plane data transmission link between the macro base station and the user equipment.

302. The small node configures an uplink or downlink user plane data transmission link between the small node and the user equipment according to the offloading configuration message.

303 The small node forwards user plane data according to the configured transmission link, where the user plane data is transmitted between the user equipment and the macro base station.

After the small node configures the uplink or downlink user plane data transmission link between the small node and the user equipment according to the offloading configuration message, an uplink user plane connection and/or a downlink user plane connection is established between the small node and the user equipment. In this way, the small node may be considered as a repeater, and the macro base station performs uplink and/or downlink user plane data transmission with the user equipment through the small node.

The small node may be a small-cell base station Pico, an indoor base station Femto, a low mobility base station LoMo, a local wireless access point AP, a UE that has a device-to-device D2D (Device to Device) function, or a low power node LPN.

It should be noted that, the data offloading method provided in the foregoing embodiment is applied to an LTE mobile communications network system, and the system includes a macro base station, a user equipment, and a small node. A coverage range of the small node is within a coverage range of the macro base station, and in the coverage range of the macro base station, a control plane is via the direct connection between the macro base station and the user equipment is kept to a direct path between the macro base station and the user equipment.

An embodiment of the present invention provides the data offloading method, the macro base station, the user equipment, and the small node. The macro base station determines an area range of the user equipment by using a measurement report sent by the user equipment. A user plane data transmission link between the macro base station and the user equipment may be selected according to the area range of the user equipment, and the user equipment and/or the small node is configured, both of which are based on a principle of reducing power consumption of the user equipment and avoiding co-channel interference generated by the user equipment on uplink receiving of the small node, so that the user equipment performs user plane data transmission with the macro base station over the selected user plane data transmission link, thereby reducing power consumed by the user equipment for sending an uplink signal, and avoiding co-channel interference generated by the user equipment on uplink receiving of the small node.

Embodiment 2

An embodiment of the present invention provides a data offloading method, and to reduce power consumed by a user equipment for sending an uplink signal and avoid co-channel interference generated on uplink receiving of a small node that is within a macro base station, the macro base station offloads uplink and downlink user plane data of a user equipment in different coverage areas of the macro base station to corresponding transmission links.

Figure 4:
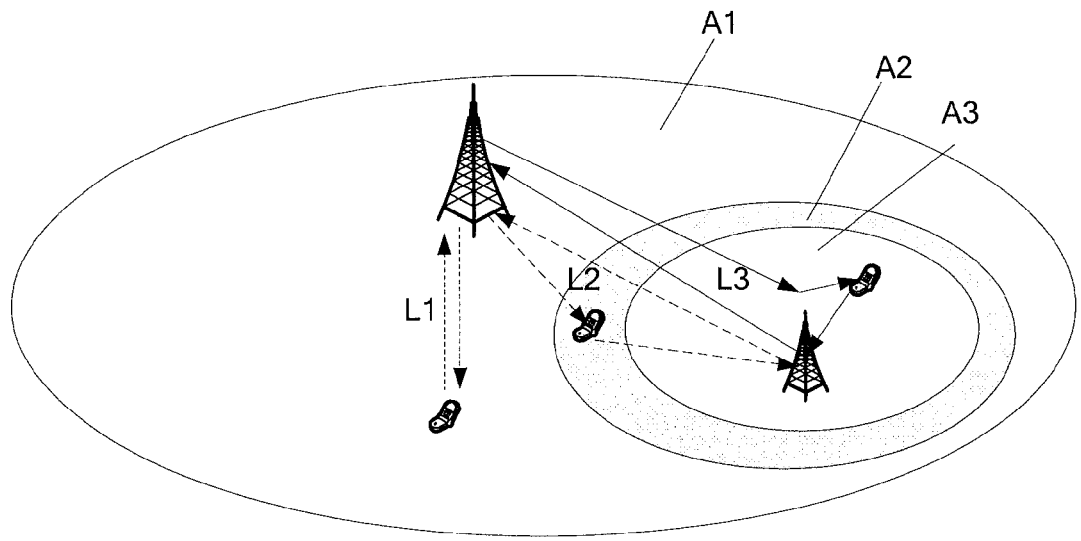
FIG. 4 is a schematic diagram of a coverage area of a macro base station.

As shown in FIG. 4, a coverage range of the macro base station includes a first area, a second area, and a third area, where the third area is a coverage range of a small node within the coverage range of the macro base station; the second area is an extended area of the small node, that is, the edge area of the small node mentioned in Embodiment 1; and the first area is the coverage range of the macro base station except the second area and the third area.

In the prior art, to cover a blind spot, a small node is generally configured within a coverage range of a macro base station. In this way, when a user equipment enters a coverage range of the small node, the macro base station hands over the user equipment to the small node, and the macro base station performs uplink and downlink user plane data transmission with the user equipment through the small node. However, when the user equipment enters an extended area of the small node (that is, an edge area of the small node), the user equipment is relatively far from the macro base station; therefore, higher transmit power is needed to send a signal to the macro base station, and in this case, power consumption of the user equipment is relatively high in the edge area of the small node. In addition, an uplink working frequency of the user equipment may be the same as that of the small node; and in the edge area of the small node, when the user equipment transmits a high-power signal to the macro base station, co-channel interference is caused on uplink receiving of the small node.

In view of this, if the user equipment enters the first area, the macro base station still configures a first transmission link over which uplink and downlink user plane data transmission is performed, where the first transmission link is a direct path between the macro base station and the user equipment. In this case, the user equipment establishes an uplink user plane connection and a downlink user plane connection to the macro base station over the direct path. For details, refer to L1 shown in FIG. 4.

If the user equipment enters the second area, the macro base station selects a second transmission link to perform uplink and downlink user plane data transmission, where the second transmission link includes an uplink over which the user equipment performs uplink user plane data transmission with the macro base station through the small node, and a downlink over which the macro base station performs downlink user plane data transmission over the direct path between the macro base station and the user equipment. In this case, the user equipment establishes an uplink user plane connection to the small node, and establishes a downlink user plane connection to the macro base station over the direct path. For details, refer to L2 shown in FIG. 4.

If the user equipment enters the third area, the macro base station configures a third transmission link over which uplink and downlink user plane data transmission is performed, where the third transmission link is a link over which the user equipment performs uplink and downlink user plane data transmission with the macro base station through the small node. In this case, the user equipment establishes an uplink user plane connection and a downlink user plane connection to the small node. For details, refer to L3 shown in FIG. 4.

Figure 5:
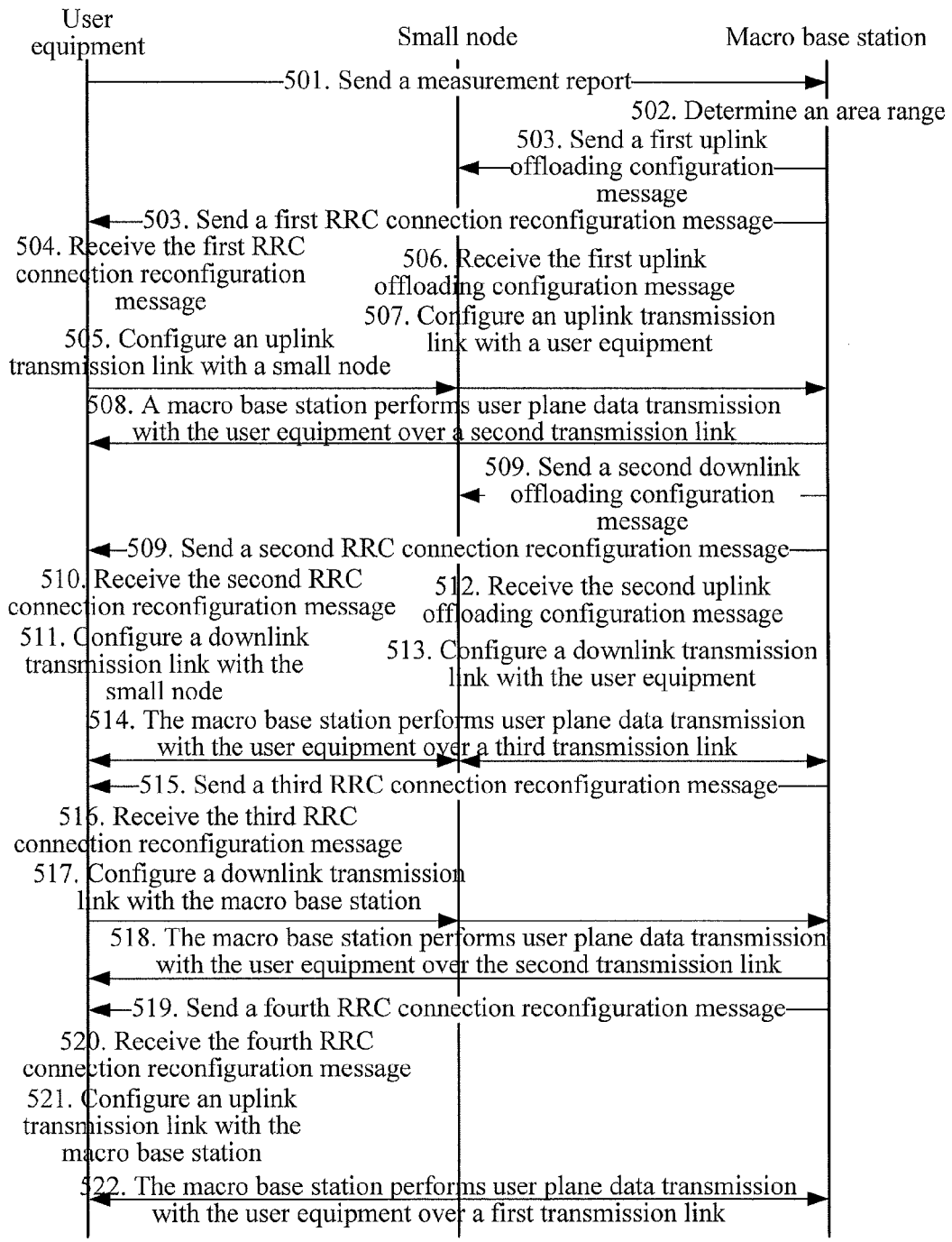
FIG. 5 is a schematic flowchart of another data offloading method according to an embodiment of the present invention.

Specifically, as shown in FIG. 5, the data offloading method includes the following:

501. A macro base station receives a measurement report sent by a user equipment.

The user equipment performs measurement according to a measurement configuration parameter configured by the macro base station the user equipment may measure a path loss from the user equipment to the macro base station, or measure signal strength RSRP and signal quality RSRQ of a signal transmitted from the user equipment to the macro base station. The user equipment may periodically report the measurement report to the macro base station or report, according to measurement reporting request message that is sent by the macro base station, the measurement report to the macro base station.

502. The macro base station determines an area range of the user equipment according to the measurement report.

The area range includes the first area, the second area, and the third area, where the first area is the coverage range of the macro base station except the second area and the third area; the second area is the extended area of the small node; and the third area is the coverage range of the small node.

As shown in FIG. 4, the coverage area of the macro base station includes a coverage area A1, an extended area A2 of a small node, and a coverage area A3 of the small node, where the coverage area A1 is a coverage area of the macro base station except the extended area A2 and the coverage area A3 of the small node.

That is, A1 is the first area, A2 is the second area, and A3 is the third area.

The macro base station may determine an area range of the user equipment according to the measurement report, where the measurement report is based on the path loss, or the signal quality and the signal strength and is reported by the user equipment.

503. If the macro base station determines that the user equipment moves from the first area to the second area, the macro base station sends a first RRC connection reconfiguration message to the user equipment, and sends a first uplink offloading configuration message to the small node, so as to configure a second transmission link, where the first RRC connection reconfiguration message includes an uplink resource for establishing an uplink user plane connection to the small node, and the first uplink offloading configuration message includes an uplink resource for establishing an uplink user plane connection to the user equipment.

If the macro base station determines that the user equipment is in the second area according to the measurement report, and may determine, according to the current transmission link of the user equipment, that the user equipment moves from the first area to the second area, the macro base station sends the first RRC connection reconfiguration message to the user equipment, and sends the first uplink offloading configuration message to the small node, where the first RRC connection reconfiguration message includes the uplink resource for establishing the uplink user plane connection to the small node, and the first uplink offloading configuration message includes the uplink resource for establishing the uplink user plane connection to the user equipment.

The first RRC connection reconfiguration message that is sent by the macro base station to the user equipment specifically includes: a physical cell identifier of the small node, an uplink frequency used by the small node, an uplink radio bearer, information about a logical channel, a transmission channel, and a physical channel, and indication information that indicates that a downlink direction of the current link is kept, where the first RRC connection reconfiguration message includes the uplink resource for establishing the uplink user plane connection to the small node.

The first uplink offloading configuration message that is sent by the macro base station to the small node includes: uplink configuration information of a PDCP (Packet Data Convergence Protocol, Packet Data Convergence Protocol), RLC (Radio Link Control, radio link control), MAC (medium access control, medium access control), and a PHY (physical layer, physical layer) of the small node, where the first uplink offloading configuration message includes the uplink resource for establishing the uplink user plane connection to the user equipment.

504. The user equipment receives the first RRC connection reconfiguration message sent by the macro base station, where the first RRC connection reconfiguration message includes the uplink resource for establishing the uplink user plane connection to the small node.

505. The user equipment configures an uplink user plane data transmission link between the user equipment and the small node according to the first RRC connection reconfiguration message.

506. The small node receives the first uplink offloading configuration message sent by the macro base station, where the first uplink offloading configuration message includes the uplink resource for establishing the uplink user plane connection to the user equipment.

507. The small node configures an uplink user plane data transmission link between the small node and the user equipment according to the first uplink offloading configuration message.

508. The macro base station performs uplink and downlink user plane data transmission with the user equipment over the second transmission link.

509. If the macro base station determines that the user equipment moves from the second area to the third area, the macro base station sends a second RRC connection reconfiguration message to the user equipment, and sends a second downlink offloading configuration message to the small node, so as to configure the third transmission link, where the second RRC connection reconfiguration message includes a downlink resource for establishing a downlink user plane connection to the small node, and the second downlink offloading configuration message includes a downlink resource for establishing a downlink user plane connection to the user equipment.

If the macro base station determines that the user equipment is in the third area according to the measurement report sent by the user equipment, and may determine, according to the current transmission link of the user equipment, that the user equipment moves from the second area to the third area, the macro base station sends the second RRC connection reconfiguration message to the user equipment, and sends the second downlink offloading configuration message to the small node, where the second RRC connection reconfiguration message includes the downlink resource for establishing the downlink user plane connection to the small node, and the second downlink offloading configuration message includes the downlink resource for establishing the downlink user plane connection to the user equipment.

The second RRC connection reconfiguration message includes: a physical cell identifier of the small node, a downlink frequency used by the small node, a downlink radio bearer, and information about a logical channel, a transmission channel, and a physical channel.

The second downlink offloading configuration message includes downlink configuration information of the PDCP, RLC, MAC, and the PHY of the small node.

510. The user equipment receives the second RRC connection reconfiguration message sent by the macro base station, where the second RRC connection reconfiguration message includes the downlink resource for establishing the downlink user plane connection to the small node.

511. The user equipment configures a downlink user plane data transmission link between the user equipment and the small node according to the second RRC connection reconfiguration message.

512. The small node receives the second downlink offloading configuration message sent by the macro base station, where the second downlink offloading configuration message includes the downlink resource for establishing the downlink user plane connection to the user equipment.

513. The small node configures a downlink user plane data transmission link between the small node and the user equipment according to the second downlink offloading configuration message.

514. The macro base station performs uplink and downlink user plane data transmission with the user equipment over the third transmission link.

515. If the macro base station determines that the user equipment moves from the third area to the second area, the macro base station sends a third RRC connection reconfiguration message to the user equipment, so as to configure the second transmission link, where the third RRC connection reconfiguration message includes a downlink resource for establishing a downlink user plane connection to the macro base station.

If the macro base station determines, according to the measurement report sent by the user equipment, that the user equipment is in the second area, and may determine, according to the current transmission link of the user equipment, that the user equipment moves from the third area to the second area, the macro base station only needs to send the third RRC connection reconfiguration message to the user equipment, where the third RRC connection reconfiguration message includes the downlink resource for establishing the downlink user plane connection to the macro base station.

516. The user equipment receives the third RRC connection reconfiguration message sent by the macro base station, where the RRC connection reconfiguration message includes the downlink resource for establishing the downlink user plane connection to the macro base station.

517. The user equipment configures a downlink user plane data transmission link between the user equipment and the macro base station over a direct path according to the third RRC connection reconfiguration message.

518. The macro base station performs uplink and downlink user plane data transmission with the user equipment over the second transmission link.

519. If the macro base station determines that the user equipment moves from the second area to the first area, the macro base station sends a fourth RRC connection reconfiguration message to the user equipment, so as to configure the first transmission link, where the fourth RRC connection reconfiguration message includes an uplink resource for establishing an uplink user plane connection to the macro base station.

If the macro base station determines, according to the measurement report sent by the user equipment, that the user equipment is in the first area, and may determine, according to the current transmission link of the user equipment, that the user equipment moves from the second area to the first area, the macro base station only needs to send the fourth RRC connection reconfiguration message to the user equipment, where the fourth RRC connection reconfiguration message includes the uplink resource for establishing the uplink user plane connection to the macro base station, thereby handing over the user equipment from the small node to the macro base station.

520. The user equipment receives the fourth RRC connection reconfiguration message sent by the macro base station, where the fourth RRC connection reconfiguration message includes the uplink resource for establishing the uplink user plane connection to the macro base station.

521. The user equipment configures an uplink user plane data transmission link between the user equipment and the macro base station over the direct path according to the fourth RRC connection reconfiguration message.

522. The macro base station performs uplink and downlink user plane data transmission with the user equipment over the first transmission link.

Optionally, to reduce information exchanged between the macro base station and the user equipment, if the user equipment moves from the first area to the third area, the macro base station needs to offload data of the user equipment to the small node, and performs user plane data transmission with the user equipment through the small node. In this way, the user equipment first enters the second area from the first area, and in this case, the first RRC connection reconfiguration message that is sent by the macro base station to the user equipment further includes: a downlink resource that is used by the user equipment and the small node to establish a downlink user plane connection.

Figure 6:
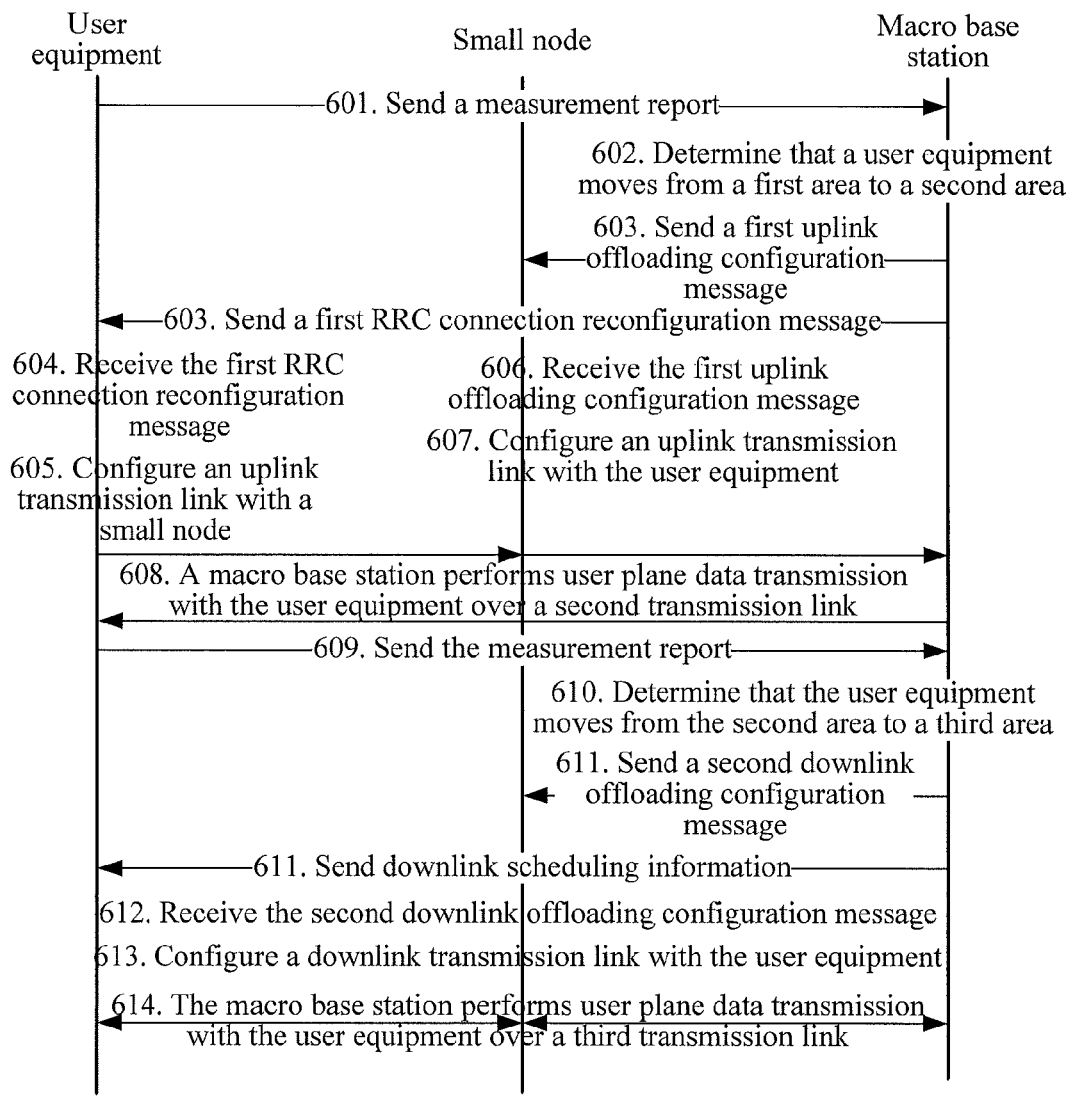
FIG. 6 is a schematic flowchart of a data offloading method according to an embodiment of the present invention.

In this way, after the macro base station receives again the measurement report sent by the user equipment and when the macro base station determines, according to the measurement report, that the user equipment enters the third area from the second area, the macro base station may not need to send the second RRC connection reconfiguration message to the user equipment, and may only need to send the second downlink offloading configuration message to the small node, so as to configure the downlink resource that is used by the small node and the user equipment to establish the downlink user plane connection, where the second downlink offloading configuration message includes the downlink resource for establishing the downlink user plane connection to the user equipment. In addition, the macro base station sends downlink scheduling information (downlink scheduling information) to the user equipment, where the downlink scheduling information instructs the user equipment to receive downlink user plane data sent by the small node. For details, refer to FIG. 6.

Accordingly, to reduce information exchanged between the macro base station and the user equipment, in a case in which the user equipment moves from the third area to the first area, the macro base station needs to offload data of the user equipment from the small node to the macro base station, and performs user plane data transmission over the direct path between the macro base station and the user equipment. In this way, the user equipment first enters the second area from the third area, and in this case, the third RRC connection reconfiguration message that is sent by the macro base station to the user equipment further includes: an uplink resource that is used by the user equipment and the macro base station to establish an uplink user plane connection.

Figure 7:
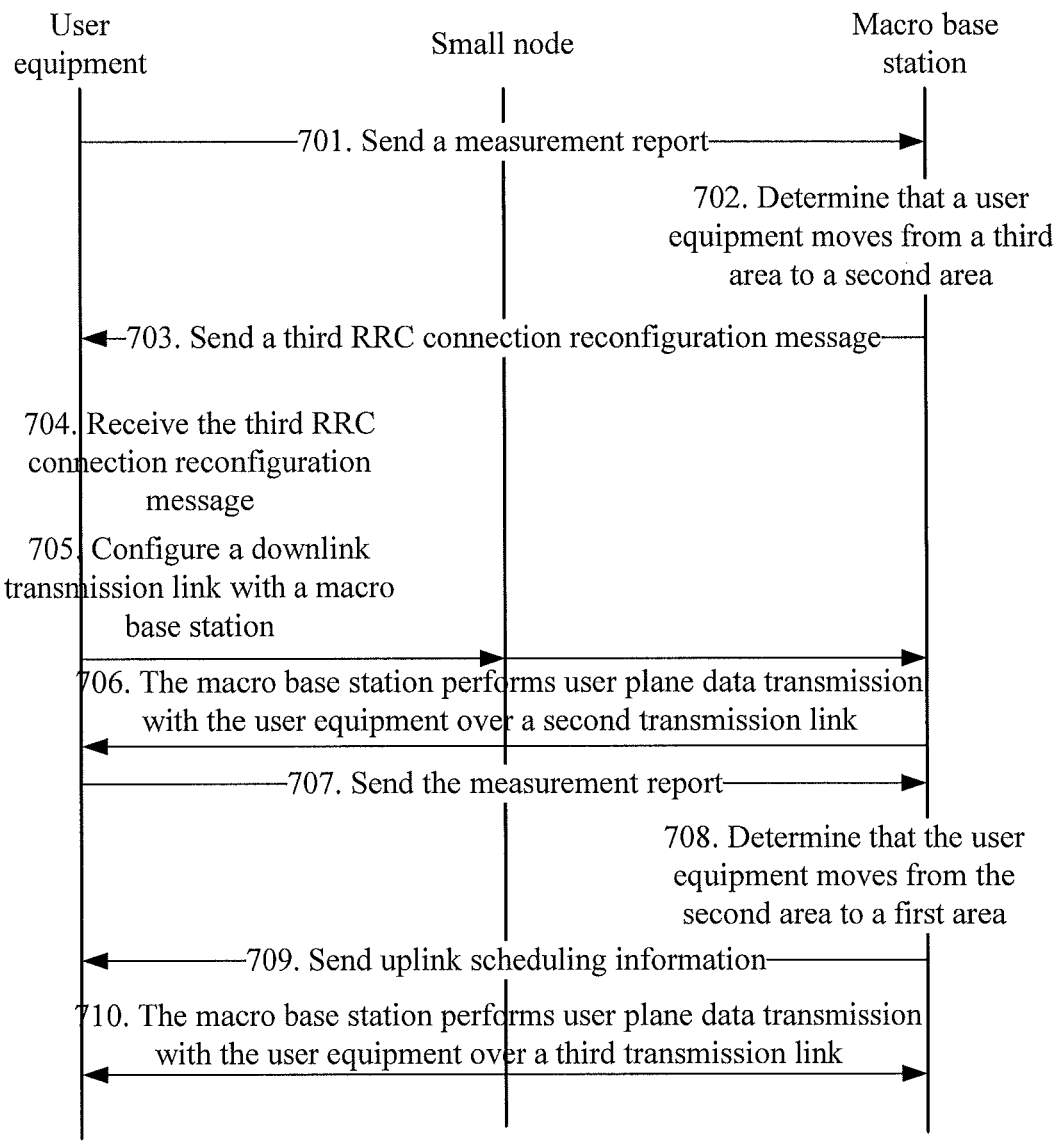
FIG. 7 is a schematic flowchart of another data offloading method according to an embodiment of the present invention.

In this way, after the macro base station receives again the measurement report sent by the user equipment and when the macro base station determines, according to the measurement report, that the user equipment enters the first area from the second area, the macro base station may not need to send the third RRC connection reconfiguration message to the user equipment, and may only need to send uplink scheduling information to the user equipment, where the uplink scheduling information instructs the user equipment to send uplink user plane data to the macro base station over the direct path between the user equipment and the macro base station. For details, refer to FIG. 7.

The small node may be specifically a small-cell base station Pico, an indoor base station Femto, a low mobility base station LoMo, a local wireless access point AP, a UE that has a device-to-device D2D function, or a low power node LPN.

The data offloading method provided in the foregoing embodiment is applied to an LTE mobile communications network system, and the system includes a macro base station, a user equipment, and a small node. A coverage range of the small node is within a coverage range of the macro base station, and in the coverage range of the macro base station, a control plane connection between the macro base station and the user equipment is kept to a direct path between the macro base station and the user equipment.

An embodiment of the present invention provides the data offloading method. According to the method, a user equipment is in a different area range; a macro base station configures a user plane data transmission link between the macro base station and the user equipment, and sends, according to the configured user plane data transmission link, an RRC connection reconfiguration message and an offloading configuration message to the user equipment and a small node respectively, so that the user equipment and the small node separately establishes, according to configuration information sent by the macro base station, an uplink or downlink resource for establishing a user plane connection, so as to perform user plane data transmission over the user plane data transmission link configured by the macro base station. The user plane data transmission link configured by the macro base station is implemented according to an offloading method that is based on an area range of the user equipment and a principle of reducing power consumption of the user equipment and avoiding co-channel interference generated on uplink receiving of the small node; therefore, the data offloading method can be used to reduce power consumption of the user equipment and avoid co-channel interference generated on the uplink receiving of the small node.

Embodiment 3

Figure 8:
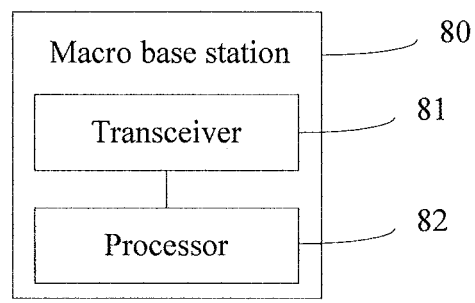
FIG. 8 is a schematic structural diagram of a macro base station according to an embodiment of the present invention.

This embodiment of the present invention provides a macro base station 80. As shown in FIG. 8, the macro base station 80 includes a transceiver 81 and a processor 82.

The transceiver 81 is configured to receive a measurement report sent by a user equipment, and send the measurement report to the processor 82.

The user equipment performs measurement according to a measurement configuration parameter configured by the macro base station; the user equipment may measure a path loss from the user equipment to the macro base station, or measure signal strength RSRP and signal quality RSRQ of a signal transmitted from the user equipment to the macro base station. The user equipment may periodically report the measurement report to the macro base station or report, according to measurement reporting request message that is sent by the macro base station, the measurement report to the macro base station.

The processor 82 is configured to receive the measurement report sent by the transceiver 81, configure a user plane data transmission link between the macro base station and the user equipment according to the measurement report, determine an RRC connection reconfiguration message and an offloading configuration message that are sent to the user equipment and a small node respectively, and send the RRC connection reconfiguration message and the offloading configuration message to the transceiver, where the RRC connection reconfiguration message includes indication information that indicates that one direction of a duplex direction of a current transmission link is kept, and resource configuration information in the other direction.

To reduce power consumption of the user equipment and avoid co-channel interference generated on uplink receiving of the small node; the processor 82 may select and configure the user plane data transmission link between the macro base station and the user equipment for the user equipment according to an area range of the user equipment, and send configuration information to the user equipment and/or the small node according to the selected and configured user plane data transmission link between the macro base station and the user equipment.

The transceiver 81 is further configured to receive the RRC connection reconfiguration message and the offloading configuration message that are sent by the processor 82, and send the RRC connection reconfiguration message and the offloading configuration message to the user equipment and the small node respectively.

The transceiver 81 is further configured to perform user plane data transmission with the user equipment over the configured transmission link.

Further, the user plane data transmission link that is between the macro base station and the user equipment and is configured by the processor 82 according to the measurement report specifically includes the following:

If the processor 82 determines that an area range of the user equipment is a first area, the transmission link configured by the processor 82 is a first transmission link, where the first transmission link is a direct path between the macro base station and the user equipment. For details, refer to L1 shown in FIG. 4.

If the processor 82 determines that the area range of the user equipment is a second area, the transmission link configured by the processor 82 is a second transmission link, where the second transmission link includes an uplink over which the user equipment performs uplink user plane data transmission with the macro base station through the small node, and a downlink over which the macro base station performs downlink user plane data transmission over the direct path between the macro base station and the user equipment. For details, refer to L2 shown in FIG. 4.

If the processor 82 determines that the area range of the user equipment is a third area, the transmission link configured by the processor 82 is a third transmission link, where the third transmission link is a link over which the user equipment performs uplink and downlink user plane data transmission with the macro base station through the small node. For details, refer to L3 shown in FIG. 4.

The first area is a coverage range of the macro base station except the second area and the third area, the second area is an extended area of the small node, and the third area is a coverage range of the small node. For details, refer to FIG. 4.

Further, if the processor 82 determines that the user equipment moves from the first area to the second area, the processor 82 is configured to send a first RRC connection reconfiguration message to the user equipment, and send a first uplink offloading configuration message to the small node, where the first RRC connection reconfiguration message includes an uplink resource that is used by the user equipment and the small node to establish an uplink user plane connection, and the first uplink offloading configuration message includes an uplink resource that is used by the small node and the user equipment to establish an uplink user plane connection.

The transceiver 81 is further configured to send the first RRC connection reconfiguration message to the user equipment, and send the first uplink offloading configuration message to the small node.

Specifically, the first RRC connection reconfiguration message includes: a physical cell identifier of the small node, an uplink frequency used by the small node, an uplink radio bearer, information about a logical channel, a transmission channel, and a physical channel, and indication information that indicates that a downlink direction of the current link is kept.

The first uplink offloading configuration message includes: uplink configuration information of a PDCP (Packet Data Convergence Protocol, Packet Data Convergence Protocol), RLC (Radio Link Control, radio link control), MAC (MAC medium access control, medium access control), and a PHY (physical layer, physical layer) of the small node.

Further, if the processor 82 determines that the user equipment moves from the second area to the third area, the processor 82 is further configured to send a second RRC connection reconfiguration message to the user equipment, and send a second downlink offloading configuration message to the small node, where the second RRC connection reconfiguration message includes a downlink resource that is used by the user equipment and the small node to establish a downlink user plane connection, and the second downlink offloading configuration message includes a downlink resource that is used by the small node and the user equipment to establish a downlink user plane connection.

The transceiver 81 is further configured to send the second RRC connection reconfiguration message to the user equipment, and send the second downlink offloading configuration message to the small node.

The second RRC connection reconfiguration message includes: a physical cell identifier of the small node, a downlink frequency used by the small node, a downlink radio bearer, information about a logical channel, a transmission channel, and a physical channel, and indication information that indicates that an uplink direction of the current link is kept.

The second downlink offloading configuration message includes downlink configuration information of the PDCP, RLC, MAC, and the PHY of the small node.

Further, if the processor 82 determines that the user equipment moves from the third area to the second area, the processor 82 is further configured to send a third RRC connection reconfiguration message to the user equipment, where the third RRC connection reconfiguration message includes a downlink resource that is used by the user equipment and the macro base station to establish a downlink user plane connection.

The transceiver 81 is further configured to send the third RRC connection reconfiguration message to the user equipment.

Further, if the processor 82 determines that the user equipment moves from the second area to the first area, the processor 82 is further configured to send a fourth RRC connection reconfiguration message to the user equipment, where the fourth RRC connection reconfiguration message includes an uplink resource for establishing an uplink user plane connection to the macro base station.

The transceiver 81 is further configured to send the fourth RRC connection reconfiguration message to the user equipment.

Optionally, the first RRC connection reconfiguration message further includes a downlink resource that is used by the user equipment and the small node to establish a downlink user plane connection, where the first RRC connection reconfiguration message is sent by the processor 82 to the user equipment.

In this way, after the processor 82 determines that the area range of the user equipment is the third area, the processor 82 is further configured to send the second downlink offloading configuration message to the small node, and send downlink scheduling information to the user equipment, where the second downlink offloading configuration message includes a downlink resource that is used by the small node and the user equipment to establish a downlink user plane connection, and the downlink scheduling information instructs the user equipment to receive downlink user plane data sent by the small node.

The transceiver 81 is further configured to send the second downlink offloading configuration message to the small node, and send the downlink scheduling information to the user equipment.

Optionally, the third RRC connection reconfiguration message further includes an uplink resource that is used by the user equipment and the macro base station to establish an uplink user plane connection.

In this way, the processor 82 is further configured to send uplink scheduling information to the small node, where the uplink scheduling information instructs the user equipment to send uplink user plane data to the macro base station over the direct path between the user equipment and the macro base station.

The transceiver 81 is further configured to send the uplink scheduling information to the user equipment.

The macro base station provided in the foregoing embodiment of the present invention is a macro base station in an LTE mobile communications network system, and the system includes a macro base station, a user equipment, and a small node. A coverage range of the small node is within a coverage range of the macro base station, and in the coverage range of the macro base station, a control plane connection between the macro base station and the user equipment is kept to a direct path between the macro base station and the user equipment.

The macro base station provided in this embodiment of the present invention determines an area range of a user equipment according to a measurement report reported by the user equipment. Based on the area range of the user equipment, a processor configures a user plane data transmission link between the user equipment and the macro base station. The user plane data transmission link configured by the processor is selected and configured based on a principle of reducing power consumption of the user equipment and avoiding co-channel interference generated on uplink receiving of a small node, so that the macro base station performs user plane data transmission with the user equipment over the user plane data transmission link that is selected and configured by the macro base station, thereby reducing power consumption of the user equipment, and avoiding co-channel interference generated by the user equipment on uplink receiving of the small node.

Embodiment 4

Figure 9:
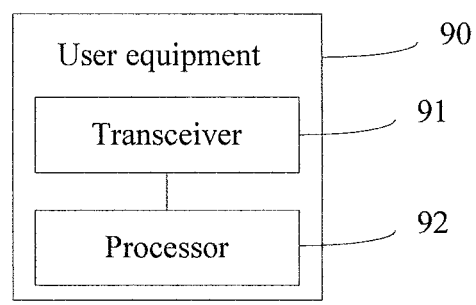
FIG. 9 is a schematic structural diagram of a user equipment according to an embodiment of the present invention.

This embodiment of the present invention provides a user equipment 90. As shown in FIG. 9, the user equipment 90 includes a transceiver 91 and a processor 92.

The transceiver 91 is configured to send a measurement report to a macro base station, so that the macro base station respectively sends an RRC connection reconfiguration message and an offloading configuration message to the user equipment and a small node according to the measurement report, so as to configure a user plane data transmission link between the macro base station and the user equipment.

The user equipment performs measurement according to a measurement configuration parameter configured by the macro base station; the user equipment may measure a path loss from the user equipment to the macro base station, or measure signal strength RSRP and signal quality RSRQ of a signal transmitted from the user equipment to the macro base station. The transceiver 91 of the user equipment may periodically report the measurement report to the macro base station or report, according to measurement reporting request message that is sent by the macro base station, the measurement report to the macro base station.

The macro base station may determine an area range of the user equipment according to the measurement report, where the measurement report is based on the path loss, or the signal quality and the signal strength and is reported by the user equipment.

The transceiver 91 is further configured to receive the RRC connection reconfiguration message that is sent according to the measurement report, which is sent by the user equipment, by the macro base station, and send the RRC connection reconfiguration message to the processor 92, where the RRC connection reconfiguration message includes indication information that indicates that one direction of a duplex direction of a current transmission link is kept, and resource configuration information in the other direction.

The processor 92 is configured to receive the RRC connection reconfiguration message sent by the transceiver 91, and configure the user plane data transmission link between the user equipment and the macro base station according to the RRC connection reconfiguration message.

The transceiver 91 is further configured to perform user plane data transmission with the macro base station over the transmission link that is configured by the processor 92.

Further, the user plane data transmission link that is between the user equipment and the macro base station and is configured by the processor 92 according to the RRC connection reconfiguration message specifically includes the following:

If the macro base station determines that an area range of the user equipment is a first area, the transmission link that is configured by the processor 92 according to the RRC connection reconfiguration message is a first transmission link, where the first transmission link is a direct path between the macro base station and the user equipment. For details, refer to L1 shown in FIG. 4.

If the macro base station determines that the area range of the user equipment is a second area, the transmission link that is configured by the processor 92 according to the RRC connection reconfiguration message is a second transmission link, where the second transmission link includes an uplink over which the user equipment performs uplink user plane data transmission with the macro base station through the small node, and a downlink over which the macro base station performs downlink user plane data transmission over the direct path between the macro base station and the user equipment. For details, refer to L2 shown in FIG. 4.

If the macro base station determines that the area range of the user equipment is a third area, the transmission link that is configured by the processor 92 according to the RRC connection reconfiguration message is a third transmission link, where the third transmission link is a link over which the user equipment and the macro base station perform uplink and downlink user plane data transmission through the small node. For details, refer to L3 shown in FIG. 4.

The first area is a coverage range of the macro base station except the second area and the third area, the second area is an extended area of the small node, and the third area is a coverage range of the small node. For details, refer to FIG. 4.

Further, if the macro base station determines that the user equipment moves from the first area to the second area, the transceiver 91 is further configured to receive a first RRC connection reconfiguration message sent by the macro base station, where the first RRC connection reconfiguration message includes an uplink resource for establishing an uplink user plane connection to the small node.

The first RRC connection reconfiguration message specifically includes: a physical cell identifier of the small node, an uplink frequency used by the small node, an uplink radio bearer, information about a logical channel, a transmission channel, and a physical channel, and indication information that indicates that a downlink direction of the current link is kept.

If the macro base station determines that the user equipment moves from the second area to the third area, the transceiver 91 is further configured to receive a second RRC connection reconfiguration message sent by the macro base station, where the second RRC connection reconfiguration message includes a downlink resource for establishing a downlink user plane connection to the small node.

The second RRC connection reconfiguration message includes: a physical cell identifier of the small node, a downlink frequency used by the small node, a downlink radio bearer, information about a logical channel, a transmission channel, and a physical channel, and indication information that indicates that an uplink direction of the current link is kept.

If the macro base station determines that the user equipment moves from the third area to the second area, the transceiver 91 is further configured to receive a third RRC connection reconfiguration message sent by the macro base station, where the third RRC connection reconfiguration message includes a downlink resource for establishing a downlink user plane connection to the macro base station.

If the macro base station determines that the user equipment moves from the second area to the first area, the transceiver 91 is further configured to receive a fourth RRC connection reconfiguration message, where the fourth RRC connection reconfiguration message includes an uplink resource for establishing an uplink user plane connection to the macro base station.

Optionally, the first RRC connection reconfiguration message further includes a downlink resource that is used by the user equipment and the small node to establish a downlink user plane connection.

In this way, after the macro base station determines that the area range of the user equipment is the third area and the macro base station sends a downlink offloading configuration message to the small node, the transceiver 91 is further configured to receive downlink scheduling information sent by the macro base station, where the downlink offloading configuration message includes a downlink resource for establishing a downlink user plane connection to the user equipment, and the downlink scheduling information instructs the user equipment to receive downlink user plane data sent by the small node.

Optionally, the third RRC connection reconfiguration message further includes an uplink resource that is used by the user equipment and the macro base station to establish an uplink user plane connection.

In this way, if the macro base station determines that the area range of the user equipment is the first area, the transceiver 91 is further configured to receive uplink scheduling information sent by the macro base station, where the uplink scheduling information instructs the user equipment to send uplink user plane data to the macro base station over the direct path between the user equipment and the macro base station.

The macro base station provided in the foregoing embodiment of the present invention is a macro base station in an LTE mobile communications network system, and the system includes a macro base station, a user equipment, and a small node. A coverage range of the small node is within a coverage range of the macro base station, and in the coverage range of the macro base station, a control plane connection between the macro base station and the user equipment is kept to a direct path between the macro base station and the user equipment.

This embodiment of the present invention provides the user equipment, and a transceiver of the user equipment sends a measurement report to a macro base station, so that the macro base station determines an area range of the user equipment according to the measurement report and configures a user plane data transmission link between the user equipment and the macro base station according to the area range, and the user equipment establishes a user plane connection according to configuration information sent by the macro base station. The user plane data transmission link configured by the macro base station is configured based on a principle of reducing power consumption of the user equipment and avoiding co-channel interference generated on uplink receiving of the small node; therefore, after establishing a user connection in a different area, the user equipment performs user plane data transmission with the macro base station according to the established user plane connection, thereby reducing power consumption of the user equipment, and avoiding co-channel interference generated on uplink receiving of the small node.

Embodiment 5

Figure 10:
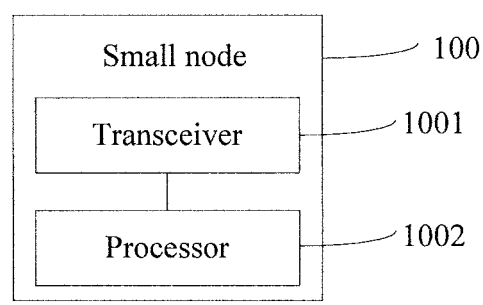
FIG. 10 is a schematic structural diagram of a small node according to an embodiment of the present invention.

This embodiment of the present invention provides a small node 100. As shown in FIG. 10, the small node includes a transceiver 1001 and a processor 1002.

The transceiver 1001 is configured to receive an offloading configuration message that is sent according to a measurement report, which is sent by a user equipment, by a macro base station, and send the offloading configuration message to the processor 1002, where the offloading configuration message carries an uplink or downlink radio resource that is used by the small node and the user equipment to establish a user plane connection.

To reduce power consumption of the user equipment and avoid co-channel interference generated on uplink receiving of the small node, the macro base station may select and configure a user plane data transmission link between the macro base station and the user equipment for the user equipment according to an area range of the user equipment, and respectively send an offloading configuration message and an RRC connection reconfiguration message to the small node and the user equipment according to the selected and configured user plane data transmission link between the macro base station and the user equipment.

The processor 1002 is configured to receive the offloading configuration message sent by the transceiver 1001, and configure an uplink or downlink user plane data transmission link between the small node and the user equipment according to the offloading configuration message.

The transceiver 1001 is further configured to forward, according to the transmission link configured by the processor, user plane data that is transmitted between the user equipment and the macro base station.

To reduce power consumption of the user equipment, the small node establishes an uplink and/or downlink user plane connection to the user equipment after configuring the uplink or downlink user plane data transmission link between the small node and the user equipment; the small node may be considered as a repeater; the macro base station performs uplink and/or downlink user plane data transmission with the user equipment through the small node.

Further, if the macro base station determines that the area range of the user equipment is a second area, the processor 1002 is further configured to configure the uplink user plane data transmission link between the small node and the user equipment according to the offloading configuration message. For details, refer to a second transmission link L2 shown in FIG. 4.

If the macro base station determines that the area range of the user equipment is a third area, the processor 1002 is further configured to configure the downlink user plane data transmission link between the small node and the user equipment according to the offloading configuration message. For details, refer to a third transmission link L3 shown in FIG. 4.

The first area is a coverage range of the macro base station except the second area and the third area, the second area is an extended area of the small node, and the third area is a coverage range of the small node. For details, refer to FIG. 4.

Further, if the macro base station determines that the user equipment moves from the first area to the second area, the transceiver 1001 is further configured to receive a first uplink offloading configuration message sent by the macro base station, where the first uplink offloading configuration message includes an uplink resource for establishing an uplink user plane connection to the user equipment.

The first uplink offloading configuration message includes uplink configuration information of a PDCP, RLC, MAC, and a PHY of the small node.

If the macro base station determines that the user equipment moves from the second area to the third area, the transceiver 1001 is further configured to receive a second downlink offloading configuration message sent by the macro base station, where the second downlink offloading configuration message includes a downlink resource for establishing a downlink user plane connection to the user equipment.

The second downlink offloading configuration message includes downlink configuration information of the PDCP, RLC, MAC, and the PHY of the small node.

The small node is a small-cell base station Pico, an indoor base station Femto, a low mobility base station LoMo, a local wireless access point AP, a UE that has a device-to-device D2D function, or a low power node LPN.

This embodiment of the present invention provides the small node, and the small node receives a configuration message that is sent according to an area range of a user equipment, by a macro base station, so that an uplink user plane connection and/or a downlink user plane connection is established between the small node and the user equipment. In this way, the small node may be considered as a repeater, and the macro base station performs user plane data transmission with the user equipment through the small node. A user plane data transmission link selected and configured by the macro base station is selected and configured based on a principle of reducing power consumption of the user equipment and avoiding co-channel interference generated on uplink receiving of the small node; therefore, the user equipment performs user plane data transmission with the macro base station, thereby reducing power consumption of the user equipment, and avoiding co-channel interference generated by the user equipment on uplink receiving of the small node.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data offloading method in a scenario in which coverage of a small node is overlaid with coverage of a macro base station, wherein the method comprises:
   receiving, by the macro base station, a measurement report sent by a user equipment;
   sending, by the macro base station according to the measurement report, an RRC connection reconfiguration message to the user equipment and an offloading configuration message to the small node, so that a user plane data transmission link configured between the macro base station and the user equipment is different when the user equipment moves to an edge area of the small node than when the user equipment moves from the edge area of the small node to the coverage of the small node, the RRC connection reconfiguration message including indication information that indicates configuration in one direction of a duplex direction of a current transmission link is kept, and resource configuration information in the other direction; and
   performing, by the macro base station, user plane data transmission with the user equipment over the configured transmission link.

2. The method according to claim 1, wherein during a process in which the macro base station performs user plane data transmission with the user equipment over the configured transmission link, a control plane connection is kept to a direct path between the macro base station and the user equipment.

3. The method according to claim 1, wherein the user plane data transmission link that is between the macro base station and the user equipment and is configured by the macro base station according to the measurement report comprises:
   determining, by the macro base station, an area range of the user equipment according to the measurement report;
   wherein if the macro base station determines that the user equipment is within a first area, the transmission link configured by the macro base station is a first transmission link, wherein the first transmission link is a direct path between the macro base station and the user equipment;
   if the macro base station determines that the area range of the user equipment is a second area, the transmission link configured by the macro base station is a second transmission link, wherein the second transmission link comprises an uplink over which the user equipment performs uplink user plane data transmission with the macro base station through the small node, and a downlink over which the macro base station performs downlink user plane data transmission over the direct path between the macro base station and the user equipment; and
   if the macro base station determines that the area range of the user equipment is a third area, the transmission link configured by the macro base station is a third transmission link, wherein the third transmission link is a link over which the user equipment performs uplink and downlink user plane data transmission with the macro base station through the small node; wherein
   the first area is a coverage range of the macro base station except the second area and the third area, the second area is an extended area of the small node, and the third area is a coverage range of the small node.

4. The method according to claim 3, wherein the sending, by the macro base station according to the measurement report, comprises:
   if the macro base station determines that the user equipment moves from the first area to the second area, sending a first RRC connection reconfiguration message to the user equipment, and sending a first uplink offloading configuration message to the small node, wherein the first RRC connection reconfiguration message comprises an uplink resource for establishing an uplink user plane connection to the small node, and the first uplink offloading configuration message comprises an uplink resource for establishing an uplink user plane connection to the user equipment;
   if the macro base station determines that the user equipment moves from the second area to the third area, sending a second RRC connection reconfiguration message to the user equipment, and sending a second downlink offloading configuration message to the small node, wherein the second RRC connection reconfiguration message comprises a downlink resource for establishing a downlink user plane connection to the small node, and the second downlink offloading configuration message comprises a downlink resource for establishing a downlink user plane connection to the user equipment;

if the macro base station determines that the user equipment moves from the third area to the second area, sending a third RRC connection reconfiguration message to the user equipment, wherein the third RRC connection reconfiguration message comprises a downlink resource for establishing a downlink user plane connection to the macro base station; and if the macro base station determines that the user equipment moves from the second area to the first area, sending a fourth RRC connection reconfiguration message to the user equipment, wherein the fourth RRC connection reconfiguration message comprises an uplink resource for establishing an uplink user plane connection to the macro base station.

5. The method according to claim 4, wherein the first RRC connection reconfiguration message further comprises a downlink resource for establishing a downlink user plane connection to the small node, sending, by the macro base station, the second downlink offloading configuration message to the small node if the macro base station determines that an area range of the user equipment is the third area, wherein the second downlink offloading configuration message comprises a downlink resource for establishing a downlink user plane connection to the user equipment, so as to configure the downlink resource that is used by the small node and the user equipment to establish the downlink user plane connection; and sending, by the macro base station, downlink scheduling information to the user equipment, wherein the downlink scheduling information instructs the user equipment to receive downlink user plane data sent by the small node.

6. The method according to claim 4, wherein the third RRC connection reconfiguration message further comprises an uplink resource for establishing an uplink user plane connection to the macro base station, sending, by the macro base station, uplink scheduling information to the user equipment if the macro base station determines that the area range of the user equipment is the first area, wherein the uplink scheduling information instructs the user equipment to send uplink user plane data to the macro base station over the direct path between the user equipment and the macro base station.

7. The method according to claim 1, wherein sending the RRC connection reconfiguration message includes sending a first RRC connection reconfiguration message and a second RRC connection reconfiguration message:

wherein the first RRC connection reconfiguration message comprises: a physical cell identifier of the small node, an uplink frequency used by the small node, an uplink radio bearer, information about a logical channel, a transmission channel, and a physical channel, and indication information that indicates that a downlink direction of the current link is kept;

the second RRC connection reconfiguration message comprises: a physical cell identifier of the small node, a downlink frequency used by the small node, a downlink radio bearer, information about a logical channel, a transmission channel, and a physical channel, and indication information that indicates that an uplink direction of the current link is kept;

the uplink offloading configuration message comprises uplink configuration information of a PDCP, RLC, MAC, and a PHY of the small node; and the downlink offloading configuration message comprises downlink configuration information of the PDCP, RLC, MAC, and the PHY of the small node.

8. A data offloading method in a scenario in which coverage of a small node is overlaid with coverage of a macro base station, comprising:

receiving, by the small node, an offloading configuration message that is sent from a macro base station according to a measurement report of a user equipment, wherein the offloading configuration message carries an uplink or downlink radio resource that is used by the small node and the user equipment to establish a user plane connection;

configuring, by the small node, an uplink or downlink user plane data transmission link between the small node and the user equipment that is different when the user equipment moves to an edge area of the small node than when the user equipment moves from the edge area of the small node to the coverage of the small node according to the offloading configuration message; and forwarding, by the small node, user plane data according to the configured transmission link, wherein the user plane data is transmitted between the user equipment and the macro base station.

9. The method according to claim 8, wherein:

if the macro base station determines that an area range of the user equipment is a second area, configuring, by the small node, the uplink user plane data transmission link between the small node and the user equipment according to the offloading configuration message; and if the macro base station determines that the area range of the user equipment is a third area, configuring, by the small node, the downlink user plane data transmission link between the small node and the user equipment according to the offloading configuration message; wherein a first area is a coverage range of the macro base station except the second area and the third area, the second area is an extended area of the small node, and the third area is a coverage range of the small node.

10. The method according to claim 9, wherein:

if the macro base station determines that the user equipment moves from the first area to the second area, receiving, by the small node, a first uplink offloading configuration message sent by the macro base station, wherein the first uplink offloading configuration message comprises an uplink resource for establishing an uplink user plane connection to the user equipment; and if the macro base station determines that the user equipment moves from the second area to the third area, receiving, by the small node, a second downlink offloading configuration message sent by the macro base station, wherein the second downlink offloading configuration message comprises a downlink resource for establishing a downlink user plane connection to the user equipment.

11. The method according to claim 8, wherein the small node is:

a small-cell base station Pico, an indoor base station Femto, a low mobility base station LoMo, a local wireless access point AP, a UE that has a device-to-device function, or a low power node LPN.

12. A macro base station, comprising:
a transceiver configured to receive a measurement report sent by a user equipment, and send the measurement report;
a processor configured to:
receive the measurement report sent by the transceiver, a user plane data transmission link between the macro base station and the user equipment being differently configured when the user equipment moves to an edge area of the small node than when the user equipment moves from the edge area of the small node to coverage of the small node which is overlaid with coverage of the macro base station, according to the measurement report,
determine an RRC connection reconfiguration message to be sent to the user equipment and an offloading configuration message to be sent to a small node, and
send the RRC connection reconfiguration message and the offloading configuration message to the transceiver, the RRC connection reconfiguration message including indication information that indicates that one direction of a duplex direction of a current transmission link is kept, and resource configuration information in the other direction;
wherein the transceiver is further configured to receive the RRC connection reconfiguration message and the offloading configuration message that are sent by the processor, and send the RRC connection reconfiguration message to the user equipment and the offloading configuration message to the small node; and
the transceiver is further configured to perform user plane data transmission with the user equipment over the configured transmission link.

13. The macro base station according to claim 12, wherein the user plane data transmission link that is between the macro base station and the user equipment and is configured by the processor according to the measurement report comprises the following:
if the processor determines that an area range of the user equipment is a first area, the transmission link configured by the processor is a first transmission link, wherein the first transmission link is a direct path between the macro base station and the user equipment;
if the processor determines that the area range of the user equipment is a second area, the transmission link configured by the processor is a second transmission link, wherein the second transmission link comprises an uplink over which the user equipment performs uplink user plane data transmission with the macro base station through the small node, and a downlink over which the macro base station performs downlink user plane data transmission over the direct path between the macro base station and the user equipment; and
if the processor determines that the area range of the user equipment is a third area, the transmission link configured by the processor is a third transmission link, wherein the third transmission link is a link over which the user equipment performs uplink and downlink user plane data transmission with the macro base station through the small node; wherein
the first area is a coverage range of the macro base station except the second area and the third area, the second area is an extended area of the small node, and the third area is a coverage range of the small node.

14. The macro base station according to claim 13, wherein if the processor determines that the user equipment moves from the first area to the second area, the processor is configured to send a first RRC connection reconfiguration message to the user equipment, and send a first uplink offloading configuration message to the small node, wherein the first RRC connection reconfiguration message comprises an uplink resource that is used by the user equipment and the small node to establish an uplink user plane connection, and the first uplink offloading configuration message comprises an uplink resource that is used by the small node and the user equipment to establish an uplink user plane connection;
the transceiver is further configured to send the first RRC connection reconfiguration message to the user equipment, and send the first uplink offloading configuration message to the small node;
if the processor determines that the user equipment moves from the second area to the third area, the processor is further configured to send a second RRC connection reconfiguration message to the user equipment, and send a second downlink offloading configuration message to the small node, wherein the second RRC connection reconfiguration message comprises a downlink resource that is used by the user equipment and the small node to establish a downlink user plane connection, and the second downlink offloading configuration message comprises a downlink resource that is used by the small node and the user equipment to establish a downlink user plane connection;
the transceiver is further configured to send the second RRC connection reconfiguration message to the user equipment, and send the second downlink offloading configuration message to the small node;
if the processor determines that the user equipment moves from the third area to the second area, the processor is further configured to send a third RRC connection reconfiguration message to the user equipment, wherein the third RRC connection reconfiguration message comprises a downlink resource that is used by the user equipment and the macro base station to establish a downlink user plane connection;
the transceiver is further configured to send the third RRC connection reconfiguration message to the user equipment;
if the processor determines that the user equipment moves from the second area to the first area, the processor is further configured to send a fourth RRC connection reconfiguration message to the user equipment, wherein the fourth RRC connection reconfiguration message comprises an uplink resource for establishing an uplink user plane connection to the macro base station; and
the transceiver is further configured to send the fourth RRC connection reconfiguration message to the user equipment.

15. The macro base station according to claim 14, wherein the first RRC connection reconfiguration message further comprises a downlink resource for establishing a downlink user plane connection to the small node;
after the processor determines that the area range of the user equipment is a third area, the processor is further configured to send the second downlink offloading configuration message to the small node, and send downlink scheduling information to the user equipment, wherein the second downlink offloading configuration message comprises a downlink resource that is used by the small node and the user equipment to establish a downlink user plane connection, and the downlink scheduling information instructs the user equipment to receive downlink user plane data sent by the small node; and the transceiver is further configured to send the second downlink offloading configuration message to the small node, and send the downlink scheduling information to the user equipment.

16. The macro base station according to claim 15, wherein:

the third RRC connection reconfiguration message further comprises an uplink resource that is used by the user equipment and the macro base station to establish an uplink user plane connection;

the processor is further configured to send uplink scheduling information to the small node, wherein the uplink scheduling information instructs the user equipment to send uplink user plane data to the macro base station over the direct path between the user equipment and the macro base station; and the transceiver is further configured to send the uplink scheduling information to the user equipment.

17. A small node, comprising:

a transceiver configured to receive an offloading configuration message that is sent from a macro base station according to a measurement report of a user equipment, and send the offloading configuration message, wherein the offloading configuration message carrying an uplink or downlink radio resource that is used by the small node and the user equipment to establish a user plane connection;

a processor configured to receive the offloading configuration message sent by the transceiver, and configure an uplink or downlink user plane data transmission link between the small node and the user equipment that is different when the user equipment moves to an edge area of the small node than when the user equipment moves from the edge area of the small node to coverage of the small node according to the offloading configuration message, the coverage of the small node being overlaid with coverage of the macro base station; and wherein the transceiver is further configured to forward, according to the transmission link configured by the processor, user plane data that is transmitted between the user equipment and the macro base station.

18. The small node according to claim 17, wherein:

if the macro base station determines that an area range of the user equipment is a second area, the processor is further configured to configure the uplink user plane data transmission link between the small node and the user equipment according to the offloading configuration message; and if the macro base station determines that the area range of the user equipment is a third area, the processor is further configured to configure the downlink user plane data transmission link between the small node and the user equipment according to the offloading configuration message; wherein a first area is a coverage range of the macro base station except the second area and the third area, the second area is an extended area of the small node, and the third area is a coverage range of the small node.

19. The small node according to claim 18, wherein:

if the macro base station determines that the user equipment moves from the first area to the second area, the transceiver is further configured to receive a first uplink offloading configuration message sent by the macro base station, wherein the first uplink offloading configuration message comprises an uplink resource for establishing an uplink user plane connection to the user equipment; and if the macro base station determines that the user equipment moves from the second area to the third area, the transceiver is further configured to receive a second downlink offloading configuration message sent by the macro base station, wherein the second downlink offloading configuration message comprises a downlink resource for establishing a downlink user plane connection to the user equipment.

20. The small node according to claim 19, wherein the small node is:

a small-cell base station Pico, an indoor base station Femto, a low mobility base station LoMo, a local wireless access point AP, a UE that has a device-to-device function, or a low power node LPN.

* * * * *